US011833734B2

(12) United States Patent
Hacksteiner et al.

(10) Patent No.: US 11,833,734 B2
(45) Date of Patent: Dec. 5, 2023

(54) PRESSURE ROLLER ARRANGEMENT, IN PARTICULAR FOR A LONGITUDINAL STRETCHING SYSTEM AND AN ASSOCIATED STRETCHING SYSTEM AND A METHOD FOR OPERATING SUCH A PRESSURE ROLLER ARRANGEMENT

(71) Applicant: BRÜCKNER MASCHINENBAU GmbH, Siegsdorf (DE)

(72) Inventors: Hannes Hacksteiner, Saalfelden (AT);
Jakob Kreitmair, Siegsdorf (DE);
Marvin Bösl, Übersee (DE); Konrad Wolfgruber, Traunstein (DE); Anton Edfelder, Unterwössen (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 377 days.

(21) Appl. No.: 17/021,211

(22) Filed: Sep. 15, 2020

(65) Prior Publication Data
US 2021/0078239 A1    Mar. 18, 2021

(30) Foreign Application Priority Data
Sep. 16, 2019   (DE) ..................... 10 2019 124 865.5

(51) Int. Cl.
*B29C 55/18*     (2006.01)
*B29L 7/00*       (2006.01)

(52) U.S. Cl.
CPC ......... *B29C 55/18* (2013.01); *B29L 2007/002* (2013.01)

(58) Field of Classification Search
CPC ......... B29L 2007/002; B29L 2007/008; B29L 2031/755
See application file for complete search history.

(56) References Cited

U.S. PATENT DOCUMENTS

| 3,354,023 A | 11/1967 | Dunnington et al. | |
| 4,408,974 A * | 10/1983 | Comerio | B29C 33/044 425/445 |
| 5,688,536 A * | 11/1997 | Van Erden | B29C 55/065 264/165 |
| 6,472,638 B1 * | 10/2002 | Sperry | B29C 66/8226 53/370.7 |
| 7,752,961 B2 * | 7/2010 | Oedl | B65H 20/02 425/143 |
| 8,368,328 B2 * | 2/2013 | Mullet | G08C 23/04 160/310 |
| 2017/0165881 A1 * | 6/2017 | Shinobudani | B29C 43/245 |

FOREIGN PATENT DOCUMENTS

| DE | 201 03 183 | 6/2001 |
| DE | 10 2017 004 753 | 11/2018 |
| EP | 0 747 199 | 12/1996 |
| EP | 0 779 144 | 6/1997 |
| JP | 2010-058437 | 3/2010 |

* cited by examiner

*Primary Examiner* — Jeffrey M Wollschlager
(74) *Attorney, Agent, or Firm* — Nixon & Vanderhye P.C.

(57) ABSTRACT

An improved pressure roller arrangement, in particular for a stretching system, and a corresponding method for operating such a pressure roller arrangement are distinguished, inter alia, by the following features:
the pressure roller arrangement further comprises a drive device,
the drive device comprises or consists of a direct drive (39) or an indirect drive.

11 Claims, 12 Drawing Sheets

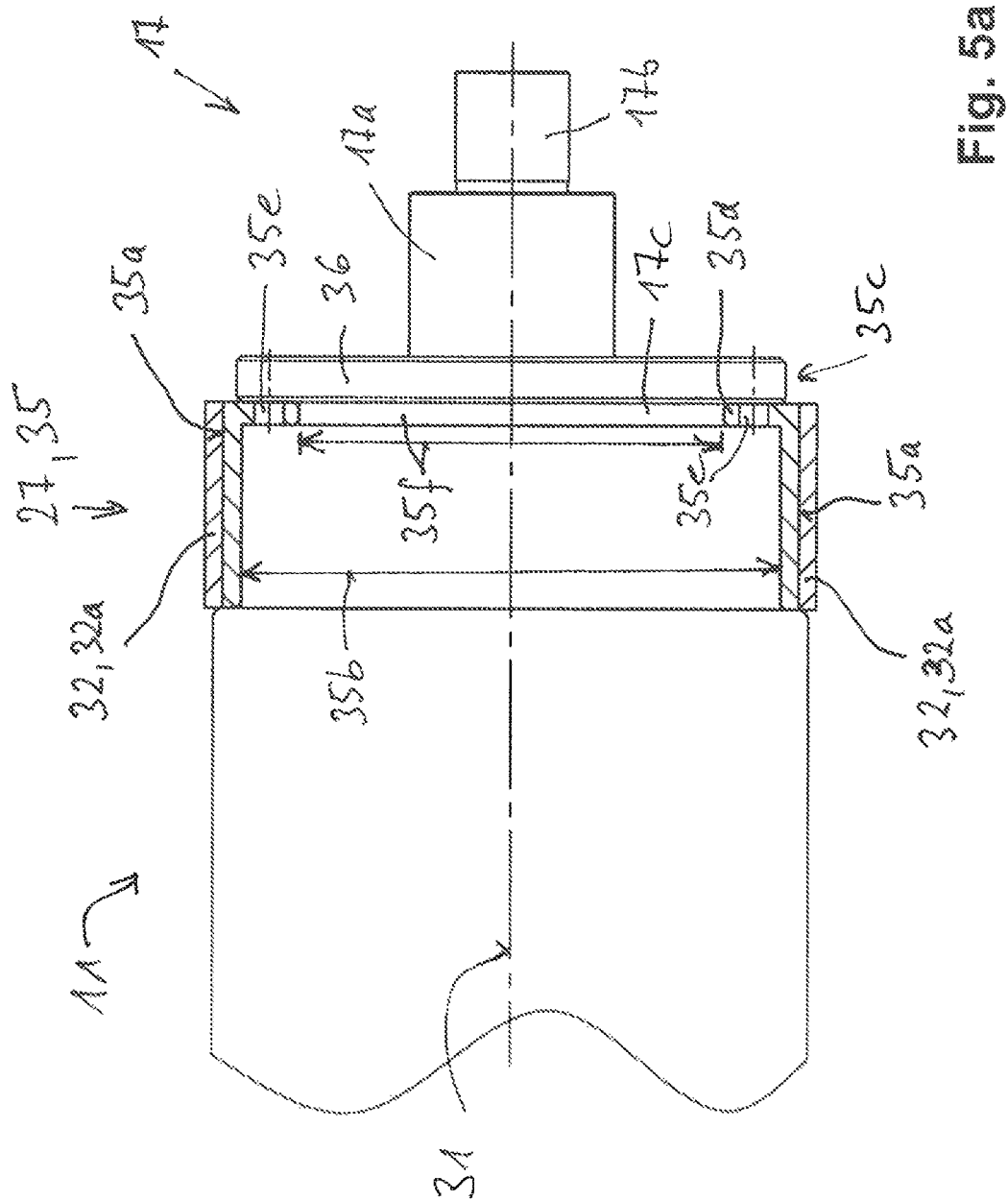

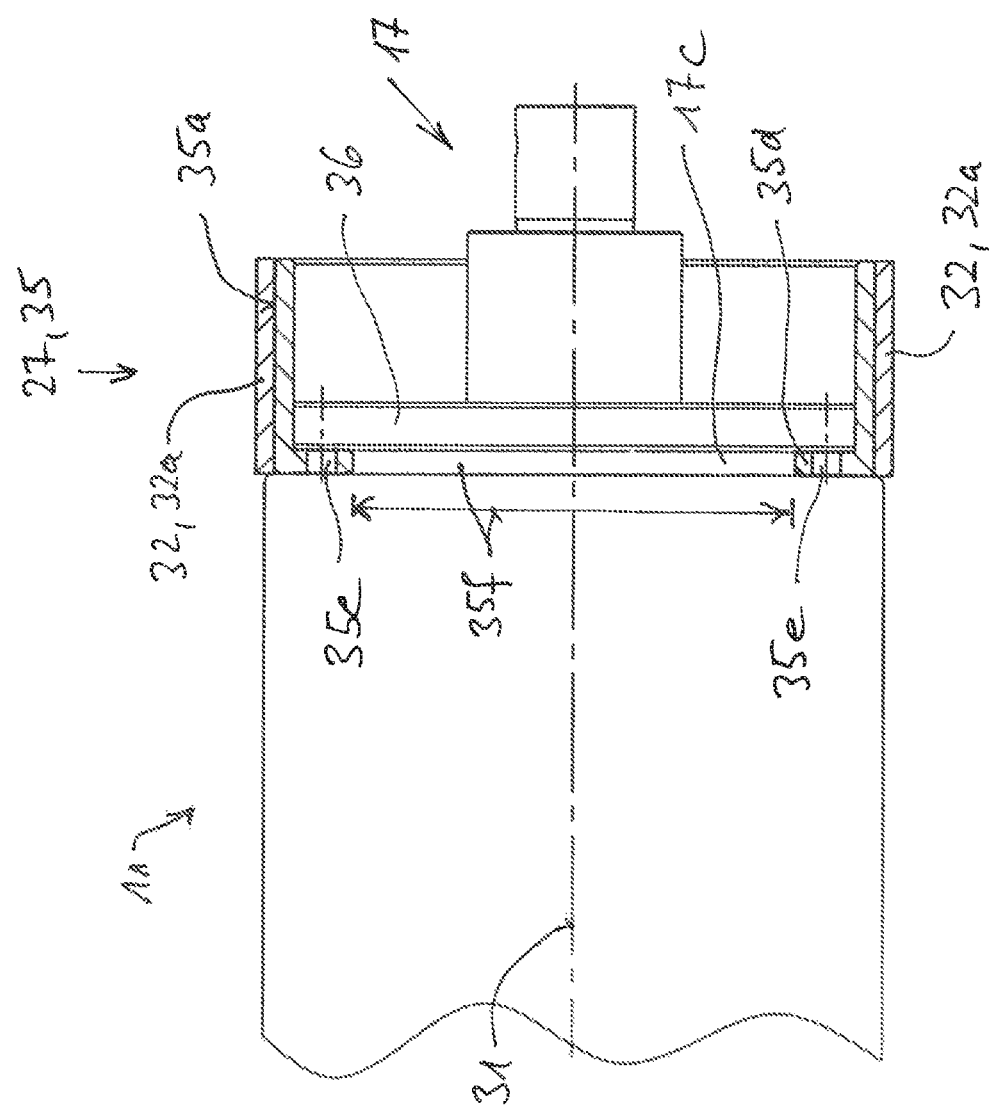

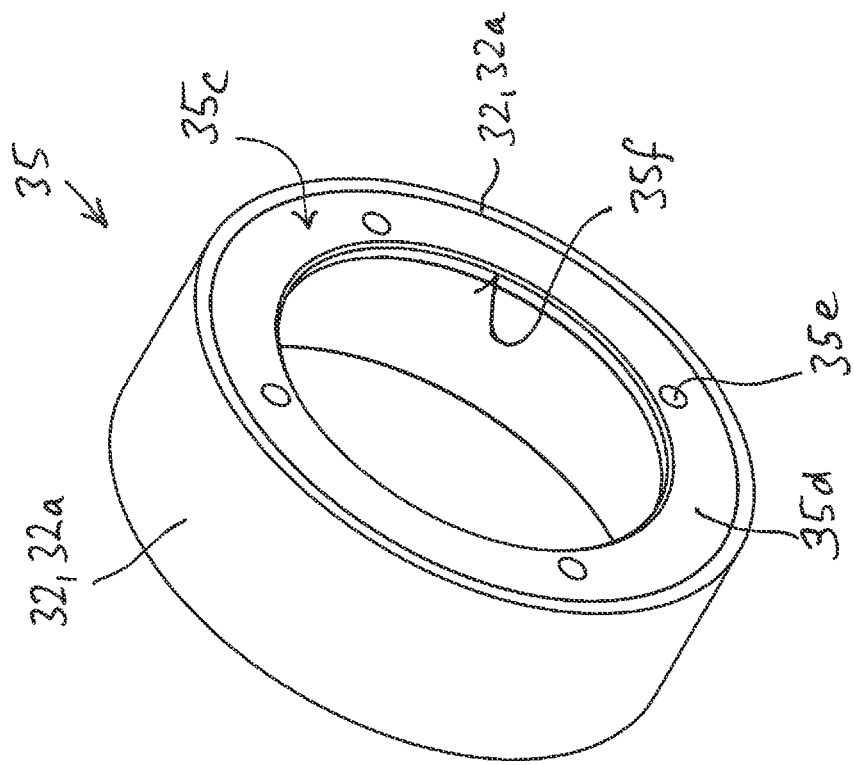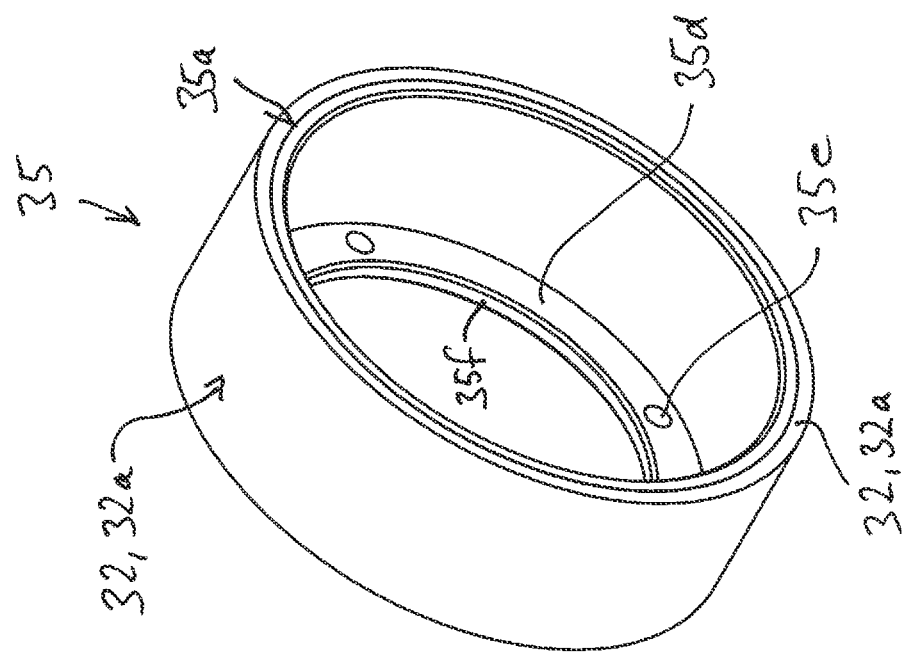

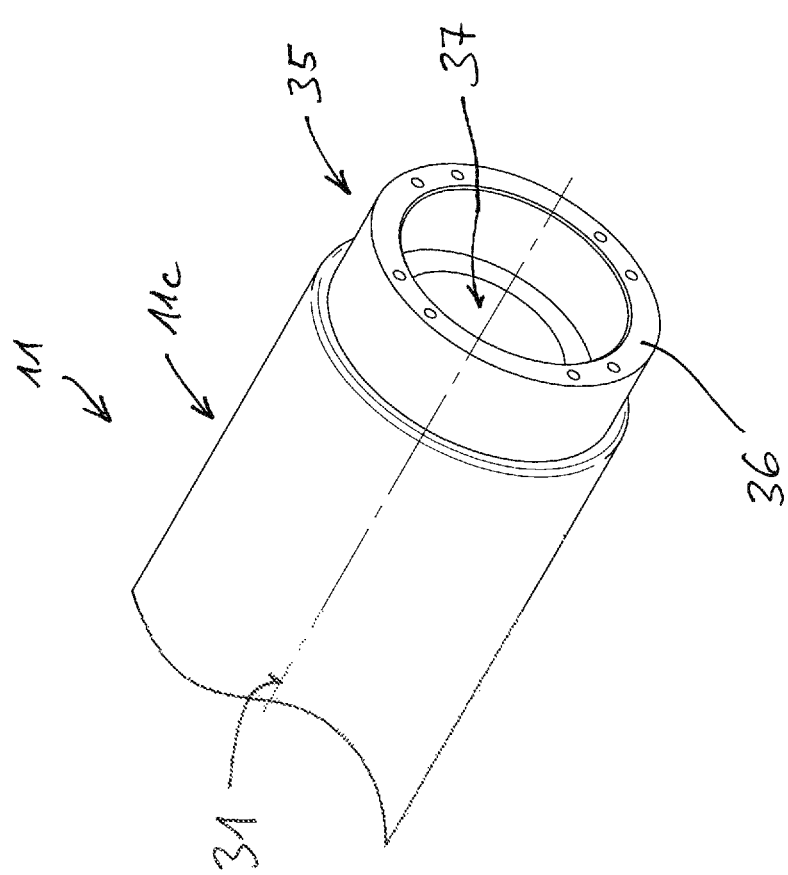

Figure 1:
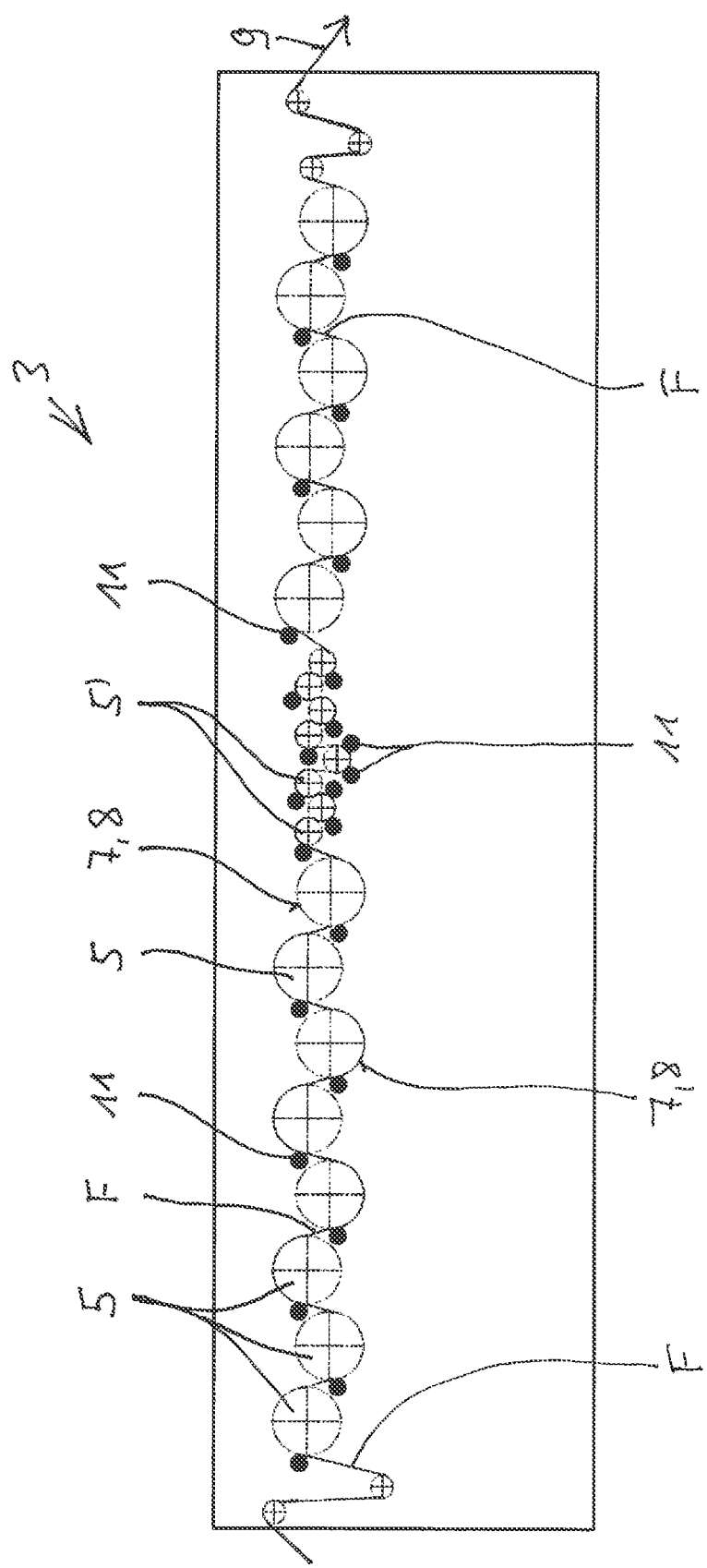

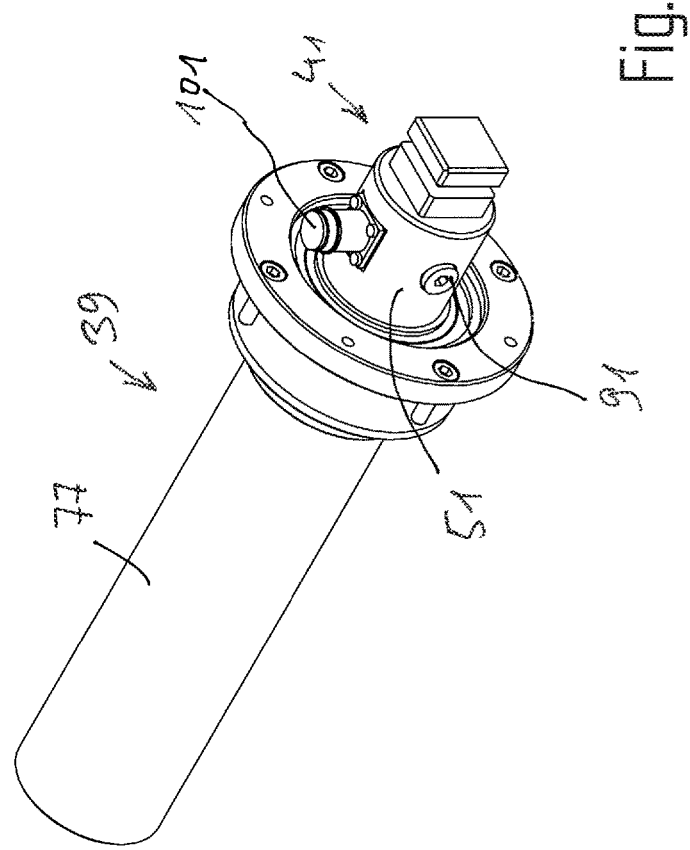
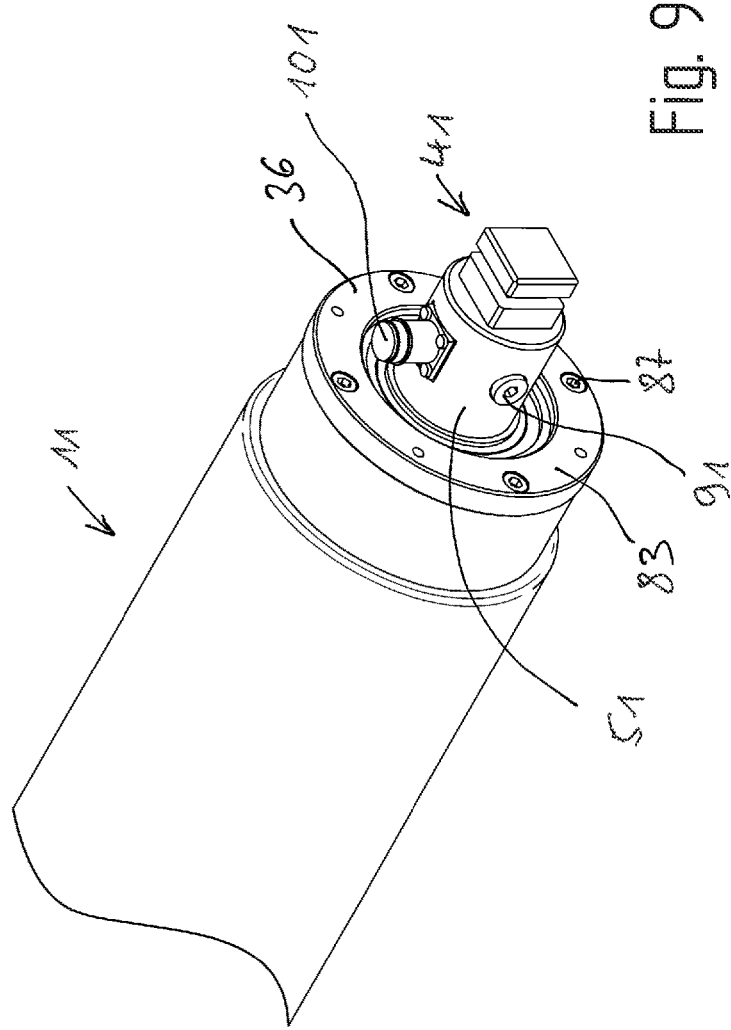

PRESSURE ROLLER ARRANGEMENT, IN PARTICULAR FOR A LONGITUDINAL STRETCHING SYSTEM AND AN ASSOCIATED STRETCHING SYSTEM AND A METHOD FOR OPERATING SUCH A PRESSURE ROLLER ARRANGEMENT

This application claims priority to DE Patent Application No. 10 2019 124 865.5 filed 16 Sep. 2019, the entire contents of which are hereby incorporated by reference.

The invention relates to a pressure roller arrangement, in particular for a longitudinal stretching system, and an associated stretching system and a method for operating such a pressure roller arrangement.

Pressure or nip rollers can be used in various technical areas. They are of particular importance in the manufacture of film, especially in the area of longitudinal stretching. Pressure rollers are generally used where film-like material webs are moved over rollers and this moving material web, using a so-called pressure or nip roller, is to be pressed onto the outer surface of a roller that interacts therewith and is also referred to below as a deflection or process roller.

In the case of plastics film longitudinal stretching units, the film is stretched longitudinally between successive rollers, with a subsequent roller rotating at a higher speed of rotation or rotational speed of the roller shell than the preceding roller. This results in a longitudinal stretching of the film in the gap between these two successive rollers.

In order to guarantee that the film rests neatly on the respective process or deflection roller, the aforementioned pressure or nip rollers are used to press the moving material web, in particular a plastics film to be stretched, over the entire surface of the shell of a deflection or process roller.

A so-called WET process is often used in the production of battery separator films (hereinafter also referred to as BSF films for short), in which process oil is mixed with the plastics film material (often polyethylene) and then extruded to form a film.

This film is then stretched in further work steps either by a simultaneous stretching system or by a sequential stretching system in the longitudinal direction, and in another stage in the width direction.

When stretching in the longitudinal direction, the film to be stretched is passed over heated rollers and thereby heated in order to bring it to the appropriate stretching temperature. The above-mentioned higher roller speed of each subsequent roller then brings about the longitudinal stretching, that is to say in the so-called longitudinal stretching direction, which is also abbreviated to the MD direction.

In order to achieve constant heating or stretching of the film, the film must be placed evenly on the roller or roller shell of a deflection or process roller without trapping any air. In order to achieve this, the aforementioned pressure rollers are used, which are also referred to as nip rollers or nip rolls.

These pressure or nip rollers therefore press the film lightly against the deflection or process roller.

The problem with this process is that the pressure or nip roller must not press too hard against the film, which is passed through the nip between a pressure or nip roller and the roller shell of a deflection or process roller. When producing a (BSF) film in a longitudinal stretching machine (MDO), an oil film surrounds the film in the process steps upstream of the longitudinal stretching machine, which can lead to the film (which is passed between the deflection or process roller and the non-rotating roller, i.e. the standing pressure or nip roller) rubbing against the pressure or nip roller. This can cause undesirable scratches or defects on the film surface.

The object of the present invention is therefore to create an improved solution for a pressure or nip roller, thus in particular a pressure roller arrangement that has a pair of rollers, preferably with a pressure or nip roller and an additional roller, for a longitudinal stretching system (i.e. a so-called MDO=Machine Direction Orienter), and an associated method for operating a corresponding pressure roller arrangement.

The object is achieved with respect to the pressure roller arrangement according to the features specified in claim 1 or 11, with respect to the stretching system according to the features specified in claim 19 and with respect to the method according to the features specified in claim 21. Advantageous embodiments of the invention are specified in the dependent claims.

The invention is based on the new knowledge that in the production and/or processing of moving material webs, in particular films or plastics films, especially in the production of battery separator films, the oily film prevents the corresponding pressure or nip rollers, when this film is applied to the roller surface of a deflection or process roller, from not rotating with it or not being set in rotation with the film passed through the nip. This causes the aforementioned undesired film defects.

It is now possible to consider pressing the pressure or nip rollers with a higher pressure on the deflection or process rollers that interact with them. As a result, the film passed between the rollers is subjected to higher pressure. However, this has the consequence that the film properties are negatively influenced.

For this reason, thought has also been given to providing the surface of the pressure or nip rollers with certain patterns that should prevent the roller surface from slipping against the oily film (similar to a hydroplaning effect). However, these patterns formed on the surface of the pressure or nip rollers are then actually reproduced on the film surface, which should also be avoided since this also produces negative effects with regard to the film properties.

The invention therefore presents a solution with a pressure roller arrangement to which a drive is assigned. By implementing a driven pressure roller, it is ultimately possible for the shell rotational speed of the pressure or nip roller to be approximately the same as the shell rotational speed of the deflection or process roller. In other words, by using a driven pressure roller, the circumferential speeds of the two co-operating rollers can be at least approximately synchronised. This avoids the disadvantages which occur in the prior art.

In the context of the invention, the drive for the pressure or nip roller can be realised directly or indirectly.

When realising a direct drive for the pressure and nip roller, this can preferably be inserted via an end face region of the actual pressure and nip roller, i.e. installed there. The entire drive unit can be designed in such a way that it only protrudes over a partial length of significantly less than 50% or 40% at the end beyond the actual roller body of the pressure or nip roller. In the protruding region, the drive motor is preferably also accommodated in a partial length. The output shaft of the drive motor and a subsequent gear arrangement, preferably in the form of a planetary gear train, are connected, for example, via an optionally provided subsequent coupling arrangement with a radial drive element and with a coupling device running back axially to the end face of the roller with a subsequent end face ring in a fixed rotary connection with the roller body of the pressure or nip roller. The entire arrangement is held by a part that protrudes outwards at the end and is stationary.

This drive unit preferably forms the so-called fixed bearing with the drive motor. At the opposite end face of the pressure or nip roller, a dummy is preferably inserted, which can be designed similarly to the aforementioned drive unit in terms of its dimensions and size. This dummy serving to support the nip and pressure roller body then preferably forms the so-called floating bearing.

In other words, the pressure and nip roller is not supported by a supporting body that continuously penetrates the pressure and nip roller, but only by central sections in the form of a fixed bearing and floating bearing, which engage only a partial length of the entire hollow central axle of the pressure and nip roller.

The corresponding drive unit can be easily installed and removed.

The aforementioned drive device for the pressure and nip roller may also be implemented in the form of an indirect drive.

In the case of an indirect drive, the invention proposes a pressure or nip roller which is provided with at least one contact section or drive section. Preferably, two contact or drive sections are provided, offset from one another in the axial direction of the pressure roller, between which sections the actual nip roller film pressure region is formed, via which a film to be processed can be pressed against another adjacent roller aligned parallel thereto in order to ensure optimal application of the film on the further roller. The at least one and preferably at least two aforementioned contact or drive sections with a larger diameter than the roller diameter in the actual nip roller film pressure region has or have, at least in the unloaded state, a larger diameter than the actual nip roller film pressure region over which the film can be or is applied to another roller.

In this case, the at least one or preferably two contact or drive sections are provided with or consist of a material which is compressible under pressure.

The thickness of this material which is compressible under pressure and/or the corresponding choice of material itself is chosen so that when a corresponding pressure roller or nip roller is used and a deflection or process roller arranged parallel thereto is brought close to the roller surface, the circumferential surface of the contact and/or drive sections of the pressure or nip roller comes into contact with the roller surface of the deflection or process roller first.

When the pressure or nip roller is brought closer and closer, the contact material in the at least one contact and/or drive section is compressed while reducing the roller diameter, with the pressure or nip roller being rotated increasingly faster due to the frictional connection with the roller shell of the deflection or process roller until, ultimately, the shell rotational speed of the pressure or nip roller is synchronised with, i.e. is the same as, the circumferential rotational speed of the deflection or process roller.

The film or the material web passed through the nip between the pressure roller and, for example, the deflection roller should preferably only be subjected to pressure by the pressure or nip roller in the direction of the deflection or process roller when the shell rotational speed of the pressure or nip roller is synchronised with the shell rotational speed of the deflection or process roller as mentioned. This means that the risk that the film guided through the nip will experience surface damage due to a different rotational speed of the pressure roller compared to the second roller is at its lowest.

Since the arrangement is such that the material web to be treated and in particular the film is narrower than the axial distance between the preferably provided two contact and/or drive sections on the pressure roller, it is ensured that the pressure roller, via the contact and/or drive sections, is always in contact or can be brought into contact with the surface of a deflection or process roller that interacts therewith and, accordingly, the pressure or nip roller is always driven at a corresponding rotational speed. As a result, no more surface damage can occur on the plastics film, since the circumferential speed of the shell also corresponds to the throughput speed of the material web or the film.

Any material which has the desired properties can be considered as compressible material in the region of the drive sections. An elastically compressible material is preferably used, for example rubber or a rubber-like material such as, for example, silicone.

In a particularly preferred variant, the corresponding contact and/or drive sections are not formed on the actual pressure or nip roller itself, but in each case on a sleeve that is provided with a corresponding compressible shell material, these sleeves being directly or indirectly and thus non-rotatably connected to the pressure or nip roller on the opposite end faces of the actual pressure or nip roller. Thus, the solution according to the invention can be used wherever corresponding pressure or nip rollers are not driven along and set in rotation via the material web or film passed between the pressure or nip roller and a deflection or process roller. It has proven to be particularly advantageous that despite the low friction, in particular between an oily film and a pressure roller, i.e. despite the "aquaplaning effect" occurring here, an indirect drive for the pressure or nip roller can ultimately be implemented, namely outside the region of the oily film (i.e. outside the working width of the film and thus to the side of the oily film). It also proves to be advantageous that no complex drive attachment is necessary for this, which would additionally require mechanical and/or electrical components in order to drive the pressure or nip rollers. This is because the invention creates a solution in which the pressure or nip roller is also driven via the rotating deflection or process roller.

This solution according to the invention results in the further advantage that no additional space is required for the solution according to the invention, since only the pressure or nip roller with the corresponding contact and/or drive sections are required to drive the pressure or nip roller (which, as mentioned, in the unloaded state have a larger outer diameter than the remaining film pressure section between the two contact and/or drive sections). This has a great advantage, especially in the region of the stretching device, since there is usually no additional space for an additional drive attachment.

The fact that the aforementioned pressure or nip rollers according to a variant according to the invention are not provided with their own drive but are ultimately driven indirectly through the surface contact between the contact and/or drive sections and the deflection or process roller also has the further advantage that the material web or film moved between the contact and/or drive sections is better "held" on the deflection or process rollers and cannot slip. Such slippage can certainly occur, especially when processing very oily films.

The invention can be optimally implemented in particular with smoothly ground pressure rollers, although, in the case of very smoothly ground pressure and nip rollers, the problem from the prior art arises: the film to be processed is moved along the surface of the smoothly ground pressure roller, and the pressure or nip roller itself does not rotate, as a result of which the described disadvantages occur.

The invention is thus preferably implemented in such a way that two contact and/or drive sections are provided offset from one another in the axial direction of the pressure roller, via which sections the pressure roller can be set in rotation in contact with a further roller. The material web is passed through therebetween, in particular in the form of the plastics film. In principle, however, it would also be possible to implement an asymmetrical solution in which only one contact or drive section is provided in the axial direction with respect to the film guided past the pressure roller, which section comes into contact with an adjacent roller in order to set the pressure or nip roller in rotation. A symmetrical solution with two such contact and/or drive sections is preferred, however.

The aforementioned contact and/or drive sections can be subdivided several times, that is to say can consist of any number of subsections. With such a design, too, these subsections are collectively referred to as contact or drive sections.

Figure 2:
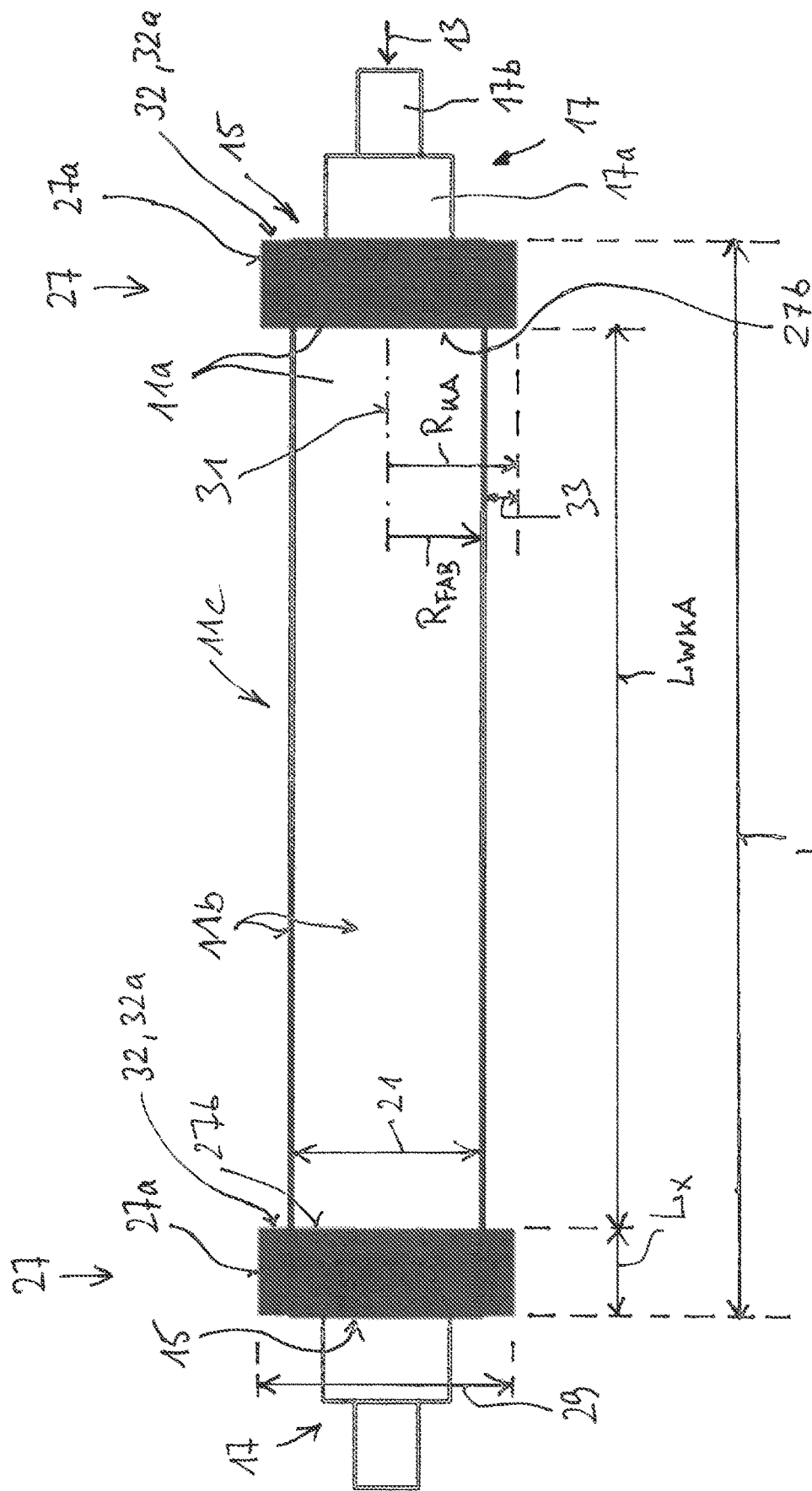
Figure 3:
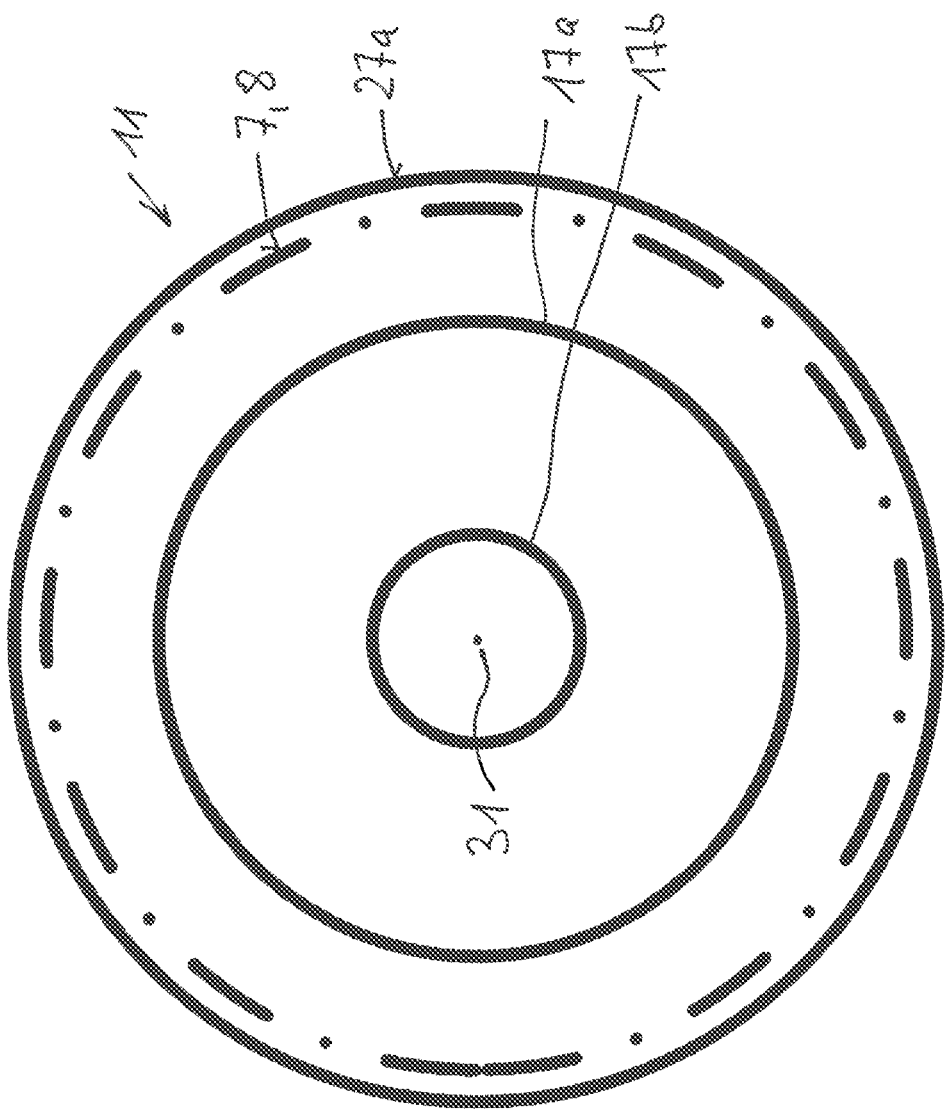
Figure 4:
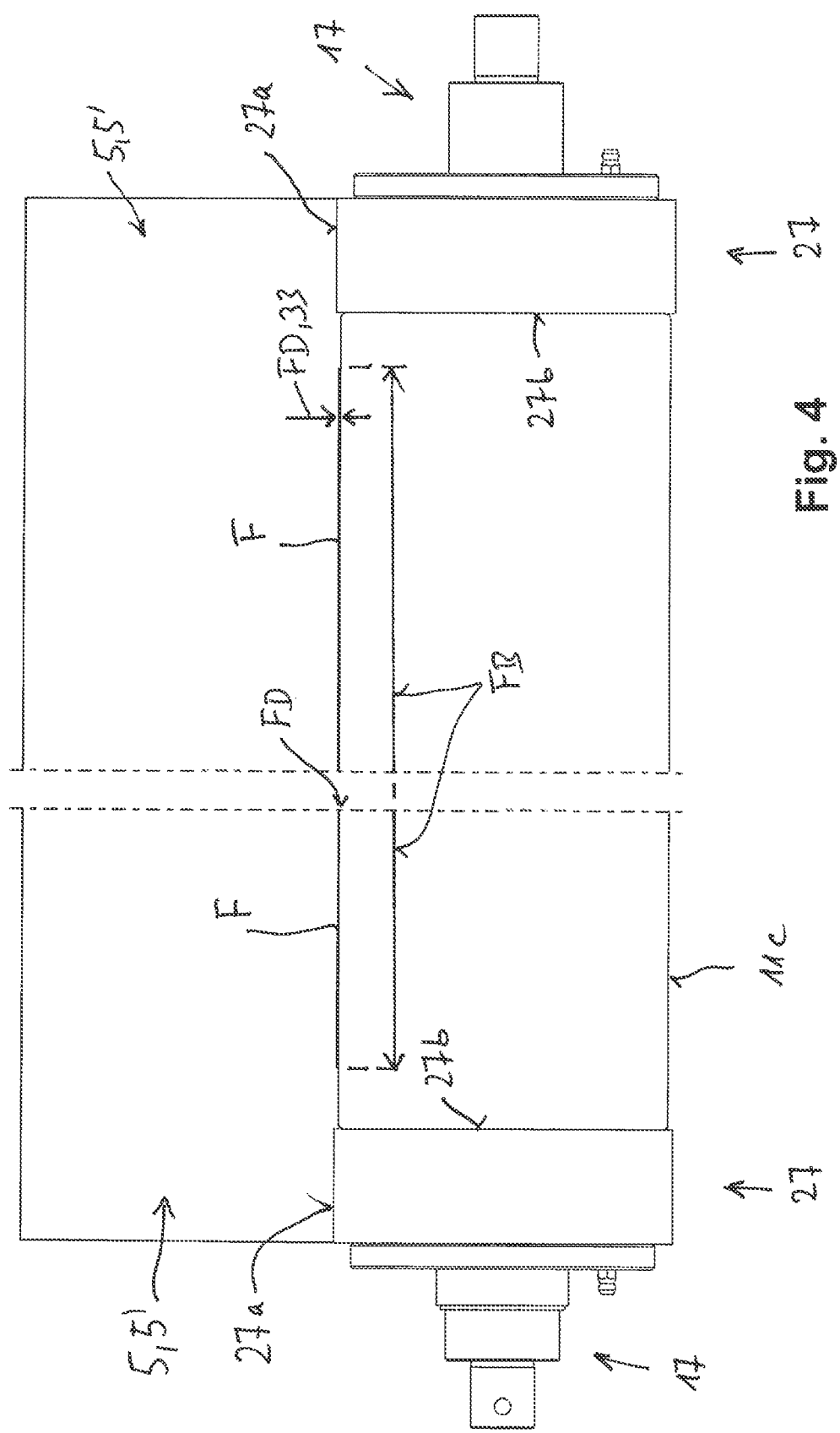
Figure 10:
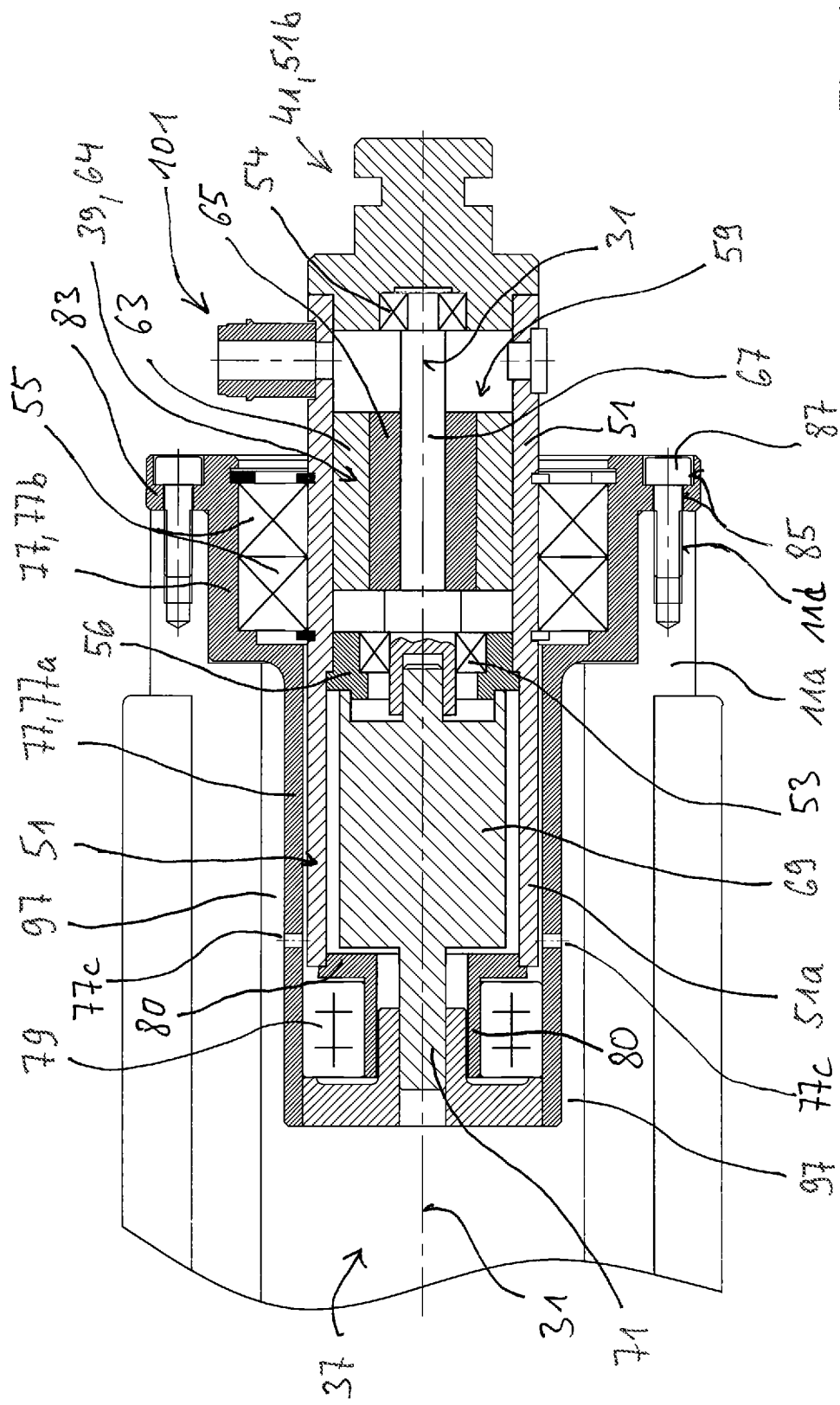
Figure 11:
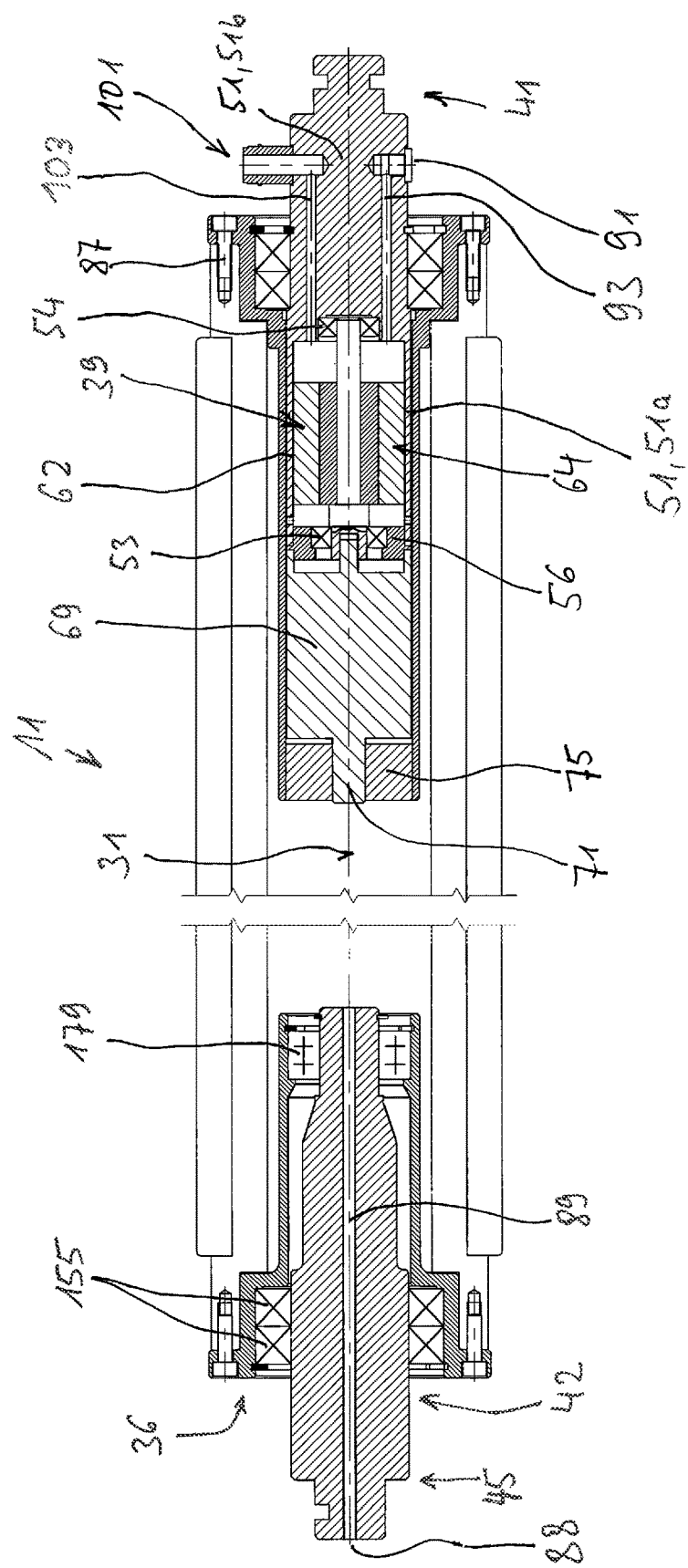
Figure 12:
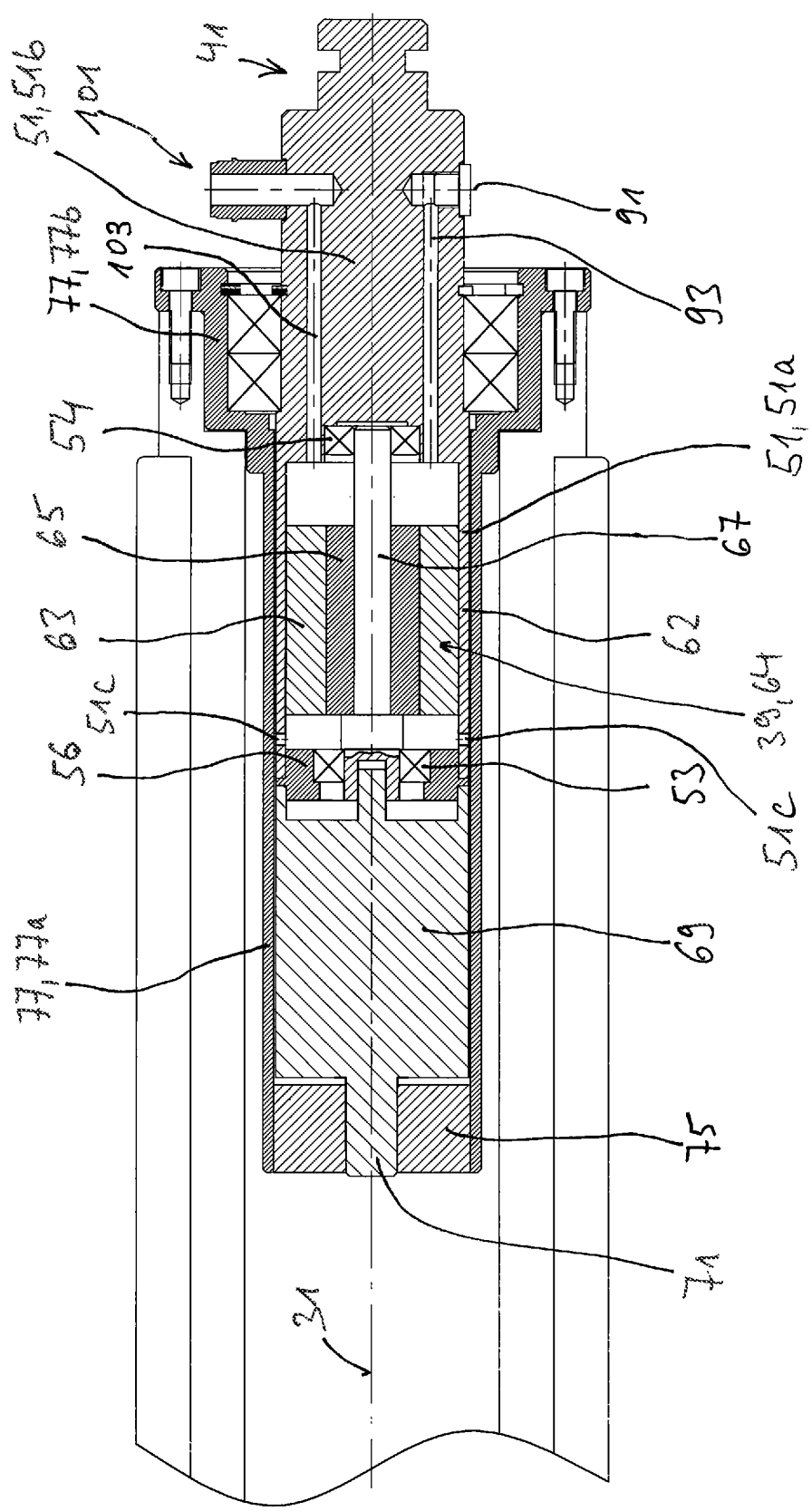

The invention will be explained in more detail hereinafter with reference to drawings, which show, in detail:

FIG. 1: a schematic side view of a longitudinal stretching system or a section of a longitudinal stretching system;

FIG. 2: a schematic side view of a pressure or nip roller according to the invention;

FIG. 3: an end-face view of the embodiment according to FIG. 2;

FIG. 4: a representation similar to the side view according to FIG. 2 in greater detail;

FIG. 5a: a schematic partial longitudinal section through the end face region of the pressure roller according to the invention and a sleeve mounted thereon according to a first embodiment variant;

FIG. 5b: a schematic partial longitudinal section through the end face region of the pressure roller according to the invention and a sleeve mounted thereon according to an embodiment variant modified from FIG. 5a;

FIGS. 6a and 6b: two three-dimensional representations of the sleeves used in connection with the pressure roller according to the exemplary embodiments according to FIGS. 5a and 5b;

FIG. 7: a schematic partial end face view of a pressure roller with an end opening before the insertion of a direct drive or dummy;

FIG. 8: a three-dimensional representation of the direct drive according to the invention;

FIG. 9: an end section of the pressure roller in a three-dimensional representation similar to FIG. 7, when the direct drive shown in FIG. 8 is inserted at the frontal end of this roller body;

FIG. 10: a partial axial section through the roller body with the direct drive inserted, which drive is particularly suitable for larger roller diameters, FIG. 11: a partial longitudinal section through the roller body (omitting a central section of the roller body) showing the direct drive in an embodiment modified from FIG. 10 at one end and an inserted dummy at the opposite end; and FIG. 12: a representation similar to FIG. 11, which shows an axial section through the roller body with a direct drive inserted, which drive, as in the variant according to FIG. 11, is particularly suitable for smaller roller diameters.

FIG. 1 is a schematic representation in side view of a longitudinal stretching system 3 with a plurality of rollers 5, which are also referred to below as deflection and/or process rollers. A longitudinal stretching system 3 can also be referred to as a longitudinal stretching unit 3 or a longitudinal stretching machine 3.

In the illustration according to FIG. 1, an extruder for processing the plastics film material is usually provided on the left, which extruder usually releases a melt via a slot die onto a cooling roller rotating in a water bath. There could also be no water bath at all. A bath with any desired cooling liquid (e.g. solvent, or any mixture) is also possible. There are therefore no restrictions to a specific cooling method.

The film that is usually solidified and/or crystallised as a result is then fed to the longitudinal stretching system 3 on the left in FIG. 1 and then runs over a number of rollers 5 in a meandering manner, before leaving the longitudinal stretching unit on the right in FIG. 1. The film is then fed to a transverse stretching unit (TDO) if it is to be additionally stretched in the transverse direction. In this respect, as with the production of the melt film, reference is made to the previously known devices and systems.

In the longitudinal stretching unit, the film F runs at a partial angle of wrap around the aforementioned rollers 5, said film then resting on the corresponding roller surface 7 or the roller shell 8 at this angle of wrap in order to be moved at the corresponding shell rotational speed.

Longitudinal stretching can then be effected between two consecutive rollers by a subsequent roller 5 in the discharge direction 9 being driven at a higher circumferential speed than a preceding roller 5 such that longitudinal stretching of the material web moving through the system is effected in the free section between two consecutive rollers, this being explained by way of example for a plastics film, or film F for short.

The individual rollers 5 are heated to the optimum temperature in each case in order to bring the film itself to the optimum stretching temperature and to maintain this temperature.

It must be ensured in the method that the film is placed on or applied to the rollers, i.e. the roller surface 7 or the roller shell 8 of the rollers 5, uniformly and without trapping any air.

For this purpose, a plurality of pressure rollers 11 are provided in the longitudinal stretching unit 3, which are also sometimes referred to below as nip rollers or nip rolls. In FIG. 1, the rollers or stretching rollers 5 are much larger and correspondingly shown as the pressure rollers 11, which are shown in cross-section in black over their entire area.

In this case, rollers or stretching rollers 5' with smaller roller diameters are also provided in an intermediate region of the longitudinal stretching unit 3. In some cases, two pressure rollers 11 are provided per roller or stretching roller 5', namely when the film is applied to the roller surface of such a roller 5' and in the region where it is lifted off this roller surface.

A first exemplary embodiment of a pressure roller arrangement with a pressure or nip roller 11 according to the invention is shown in a schematic side view (that is, transversely to the axial longitudinal extension) in FIG. 2. A corresponding axial view according to arrow 13 in FIG. 2 is shown in FIG. 3. The pressure roller 11 has an overall axial length L.

On the opposite end face regions 15 formed in this way, for example, there may be a stepped axle stub 17 protruding beyond the axial length L of the actual pressure roller 11 in the exemplary embodiment shown, which stub is or may be designed with two stub sections 17a and 17b which, compared with the actual pressure roller diameter 21, have a stepwise smaller diameter.

In the exemplary embodiment shown according to the side view in FIG. 2, the pressure roller arrangement comprises the pressure roller 11 with the axle stub 17 which is usually provided (regardless of whether the design of this axle stub 17 is single or multi-stepped), the pressure roller 11 having a roller body 11a or roller body section 11a having a roller surface 11b. Furthermore, the pressure roller 11 has an actual nip roller film pressure region 11c, to which, in the exemplary embodiment shown, offset in the axial direction, i.e. opposite each other, a contact and/or drive section 27 with a short axial length Lx in relation to the total length L of the pressure roller 11 connects. In this exemplary embodiment, the nip roller film pressing region 11c extends at least over a partial length $L_{WKA}$.

These two contact and/or drive sections 27 have a diameter 29 which, in the unloaded state, is greater than the diameter 21 of the pressure roller 11 in the roller section between the two contact and/or drive sections 27, which are remote from one another.

In the end face view according to FIG. 3, the roller shell 8, that is to say the roller surface 7, located behind the roller section 27 is shown as a dash-dot line concentrically to the centrally running axis of rotation or central axis 31.

In other words, this results in a difference 33 (see FIG. 2), which results in a degree of difference between the radius $R_{FAB}$ in the nip roller film pressing region 11c (i.e. in the region that lies between the two contact and/or drive sections 27) and the radius $R_{KA}$ in the region of the contact and/or drive sections 27.

The roller sections 27 are formed from a compressible material 32 and comprise, in a circumferential region, i.e. a shell layer 32a, a compressible material which has at least a corresponding thickness and which is preferably elastically compressible, such as rubber or a rubber-like substance, for example silicone. The significance of this material will be discussed below.

In practice, the aforementioned pressure or nip rollers 11 are adjusted by suitable angle adjustment devices and/or are brought close to the surface of a co-operating deflection or process roller 5, 5' by suitable adjustment devices, thus forming a nip 34 (see also FIG. 4) between the roller surface 7 of a roller 5, 5' and the roller surface 1ib of a pressure or nip roller 11.

Since the diameter of the pressure roller 11 in the region of the contact and/or drive section 27 is larger than in the region in between, and since the pressure or nip roller 11 is aligned parallel to the roller 5 or 5', when the rollers are brought laterally closer, thereby reducing the lateral distance, the outer circumference or the surface 27a of the two contact and/or drive sections 27 comes into contact with the roller surface 7 or the roller shell 8 of the deflection or process roller 5 or 5' aligned parallel to the pressure roller 11 first. At this point in time, the aforementioned radius difference 33 between the outer circumference 27a of the contact and/or drive section 27 and the roller surface 1ib in the film pressing region 11c is greater than the thickness of the material web or the film F passed through the nip 34. Therefore, at this point in time, the pressure roller cannot exert any pressure on the material web or the film F in its nip roller film pressure region 11c.

By increasing the contact pressure of the contact and/or drive sections 27 on the roller 5, 5', the preferably elastomeric and thus compressible material of the respective contact and/or drive section 27 is more and more compressed and the nip 34 between the pressure roller 11 and the deflection or process roller 5, 5' described is reduced until the pressure roller 11, in the nip roller film pressure region 11c between the contact and/or drive sections 27, by means of its roller surface 1ib, touches the film passed through the nip and presses with the desired application force on the surface of the roller 5 or 5'.

However, since, as explained, the pressure or nip roller 11 initially comes into contact with the rotating deflection or process roller 5 in the region of its contact and/or drive sections 27, the friction between the roller surface 7 of the roller 5, 5' and the contact and/or drive sections 27 increasingly and more quickly sets the pressure and nip roller 11 in rotation from their stationary (i.e. non-rotating) starting position, until ultimately both interacting rollers rotate synchronously, that is, with the same shell rotational speeds. Preferably only when these rotational speeds are synchronous, i.e. the same, should the elastic material be compressed in the contact and/or drive sections 27 so strongly that the real radius $R_{KA}$, minimised by compression, has a dimension that is the sum of the radius $R_{FAB}$ in the region of the film pressing region 11c (between the contact and/or drive sections 27) plus the film thickness FD, as can be seen from the schematic top view, in particular according to FIG. 4.

In this way, an indirect drive for the pressure roller 11 is realised, namely not using its own direct drive, but via the rotation of the roller 5 which co-operates with the pressure roller 11. This indirect drive is also effectively realised when the roller surface 11b and/or the film pressing region 11c of the roller body 11a is ground completely smooth.

As can also be seen from FIG. 4, the film width FB is at least 1%, preferably at least 5% or at least 7.5% or at least 10% narrower than the clear distance between the mutually facing sides 27b of the contact and/or drive sections 27. In this clear distance, the material web or the film F is ultimately essentially guided so that even oily material webs or films F cannot or not so easily slip on the surface of the roller 5 in the axial direction.

It is further noted that the compressible material in the region of the at least one contact and drive section 27 is compressible under pressure to such an extent a) that the diameter of the at least one contact and drive section 27 corresponds to the diameter of the pressure roller 11 in the nip roller film pressure region 11c or is less than 5% or less than 4%, 3%, 2%, 1% or 0.5% larger than the diameter of the pressure roller 11 in the nip roller film pressure region 11c, or b) that the diameter of the at least one contact and drive section 27 is greater by the thickness of the plastics film F to be fed along in the nip roller film pressure region 11c than the diameter of the pressure roller 11 in the nip roller film pressure region 11c.

Reference is made below to FIGS. 5a to 6b, in which two modified implementations of the solution according to the invention are shown.

In these embodiment variants, sleeves 35 are now used to produce the contact and/or drive sections 27, as shown individually in two three-dimensional representations in FIGS. 6a and 6b, both in a front view and in a rear view.

These sleeves 35 are attached to the roller body 11a of the pressure or nip roller 11, that is to say connected in a rotationally fixed manner to this roller body 11a, and therefore rotate together with this roller body 11a (FIG. 5a or 5b). In the illustration according to FIGS. 5a and 5b, only the attached sleeve 35 is shown in section.

According to FIGS. 6a and 6b, the sleeve 35 comprises a cylindrical sleeve shell 35a, the free sleeve inner diameter 35b of which is equal to or at least slightly larger than the outer diameter of the roller shell 8. The sleeve 35 shown in FIGS. 6a and 6b preferably has an inwardly protruding mounting flange 35d on its one end face 35c (hereinafter also sometimes referred to as the end face attachment 35d), in which bores 35e are made to screw into place the sleeve 35 formed in this way on the end face 15 of the pressure roller 11. As a result, the sleeve 35 formed in this way is non-rotatably connected to the pressure or nip roller 11.

In the exemplary embodiments shown according to FIGS. 5a and 5b, the respective sleeve 35 is not fastened directly to the end face of the pressure or nip roller 11 by means of screws (although that would be possible), but using a fastening ring 36, which is also provided with bores which align with the holes 35e in the flange 35d of the sleeve. The flange 35d is then received and clamped between the end face 15 of the pressure or nip roller 11 and the fastening ring 36 in a sandwiched manner.

As can also be seen from the drawings according to FIGS. 6a and 6b, the end face attachment 35d is preferably designed as an annular flange which has an internal opening 35f, the diameter of which is greater than the diameter of the corresponding axle stub 17 which protrudes through this opening 35f.

In a departure from the exemplary embodiment shown, it is of course also possible in principle that the corresponding sleeve 35 could alternatively or additionally also be mounted on the axle stub 17 of the pressure or nip roller 11 with a correspondingly adapted design.

In the exemplary embodiment shown, the material 32 compressible under pressure is provided on the outer surface of the sleeve shell 35a, for example as a circumferential layer or shell layer 32a, which is provided in sufficient thickness to be compressible to a sufficient extent in use. With this design, the corresponding contact and drive section 27 is now formed on the sleeve 35, which can preferably even be retrofitted. In the illustration according to FIGS. 6a and 6b, the preferably elastically compressible shell layer 32a covers the outer surface of the sleeve shell 35a.

The sleeves shown by way of example in FIGS. 6a and 6b can preferably be mounted on the pressure or nip roller 11 in different orientations.

In the variant shown in FIG. 5a, the pot-shaped sleeves 35 with the associated mounting ring flange 35d, in other words the end face attachments 35d in general are mounted at the pressure or nip roller 11 in such a way that the sleeve shell 35a forming the contact and/or pressure section 27 engages over the region adjoining the end face of the pressure and nip roller, in other words the corresponding end sections of the pressure or nip roller 11 engage in this sleeve-shaped or pot-shaped receiving space of the sleeve 35.

Since the outer circumference 27a of the shell layer 32a sitting on the sleeve 35 projects only relatively slightly beyond the roller surface 11b, the pressure or nip roller 11 can be provided with a smaller outer diameter in the region in which it dips into the sleeve 35. This outer diameter corresponds to the free inner diameter of the sleeve or is preferably at least slightly smaller, so that the sleeve can be pushed onto the roller body and fastened to it without any problems during assembly. The end face of the pressure or nip roller 11 can also be provided on its end face with a tapered axial protrusion 17c, the outer diameter of which corresponds to the inner diameter of the sleeve 35 in the region of the flange 35d or is preferably at least slightly smaller. As a result, this disc-shaped protrusion 17c may engage or protrude through the opening 35f.

The dimensions of the outer surface of the sleeve 35 and/or the thickness of the compressible material 32 formed thereon is comparable to the dimensional information explained on the basis of the previous exemplary embodiments, in which the contact and/or pressure section 27 is an integral part or preferably an integral part of the pressure or nip roller 11.

In other words, the pressure or nip roller 11 in the exemplary embodiment according to FIG. 6a not only comprises a three-part structure (as explained with reference to FIGS. 2 and 3), but at least a three-part structure with a roller body 11a on which the sleeves 35 are mutually opposite and offset from one another in the axial direction the sleeves, which are designed as separate components and which, in the exemplary embodiment shown, are mounted (detachably) at the corresponding point on the end faces of the pressure or nip roller 11.

In the variant shown in FIG. 5b, a similar partial longitudinal section is shown through a pressure or nip roller 11 in its end or end face region, again with a sleeve 35 non-rotatably mounted thereon. In this variant, however, the hollow cylinder-shaped sleeve body 35, which is partially formed like a pot by the circumferential end-face annular flange 35c, is mounted on the pressure or nip roller 11 in an orientation rotated by 180° relative to the variant shown in the exemplary embodiment according to FIG. 5a. This is because the open region of the sleeve 25 does not receive the end region of the associated pressure or nip roller 11 (which penetrates therein), as in the variant according to FIG. 5a, but protrudes from the end of the pressure or nip roller 11. Inside, the sleeve is then penetrated by the axle stub arrangement 17.

This makes it possible for the pressure or nip roller 11 to have a roller body 11a, the roller shell or roller surface 11b of which has the same diameter over the entire axial length L.

With such a design, the actual roller body 11a of the pressure or nip roller 11 can be made shorter in its axial longitudinal extension, because it only has to have an axial length that is preferably at least slightly greater than the working width, i.e. the width of the film to be processed. This is so because the actual contact and drive section 27 extends away from the associated roller body and does not cover part of its outer surface.

In both of the illustrated exemplary embodiments, the corresponding pressure and/or contact material is provided on these sleeves 35, which are fastened at the end of the pressure roller 11 or the roller body 11a, which material is in the form of a hollow cylinder with a corresponding shell thickness, in order to set the actual pressure roller 11 in rotation from the beginning of contact with the roller surface 7 of a roller 5, 5' by the frictional engagement caused thereby.

The overall design can be such that the pressure roller 11 already exerts pressure on the film when, for example, the pressure roller 11 first has a shell rotational speed that corresponds to 50% and more of the shell rotational speed of the rotating roller 5. Preferably, however, the shell rotational speed of the pressure roller should be at least 60%, preferably at least 70%, 80% or at least 90% or 95% and preferably 100% of the shell rotational speed of the roller 5 or 5' if the corresponding film pressure region 11c of the pressure or nip roller 11 guides the material web or film F and presses it against the roller 5, 5' with a desired force which does not exceed the optimal predetermined limit values.

It is noted here that the contact and/or drive sections 27 do not necessarily require sleeves 35. Rather, it is sufficient to use roller-, cylinder- or, for example, wheel- or tire-shaped or -like contact and/or drive sections 27, which may form a fixed part of the pressure roller but do not have to and can also represent separate components. These separate add-on parts, which are preferably provided in the form of sleeves, can even be retrofitted to the pressure or nip roller 11 while forming the contact and/or drive sections 27.

The contact and/or drive sections 27 can thus represent a fixed or integral part of the pressure or nip roller 11. These contact and/or drive sections 27 may, however, as explained, even be built onto a pressure or nip roller 11 as retrofittable components. The sleeves 35 are particularly suitable for this case. As also mentioned, the use of only one contact and/or drive section 27 can be sufficient, i.e., for example, the use of only one sleeve with only one contact and/or drive section 27.

With the aid of the other figures, a nip or pressure roller 11 according to the invention is now shown, the drive device of which is not realised indirectly, as in the previous embodiment, but directly.

On the basis of FIG. 7, for example, one end of a pressure or nip roller 11 is shown, specifically with the nip roller film pressure region 11c, as well as a roller end section 35 protruding beyond it at the end. In the three-dimensional representation according to FIG. 7, the roller cavity 37 can be seen, which penetrates the entire pressure or nip roller 11.

A direct drive 39, which is also referred to below as direct drive 39 for short, can then be inserted and mounted axially in this end face 36 of roller end section 35.

Such a direct drive can be seen, for example, in FIG. 8.

The further design of this direct drive is also explained below with reference to the other figures.

FIG. 9 shows how the direct drive 39, shown separately in FIG. 8, is installed in its installed position on an end face 36 of the pressure and nip roller 11.

In FIGS. 8 and 9, at the end of the direct drive 39, the mounting section 41 protruding beyond the roller body 11a in the installed state can be seen. Various connections are formed on this. A purge air seal 91 can be seen. For example, a second purge air seal can be provided on the side opposite by 180°.

An electrical connection 101 can also be seen, which can serve as an electrical plug or plug connection in order to supply the electric motor 64 with energy in particular. This plug or plug connection is required for the data and power cables leading into the interior of the drive housing 51.

A partial axial longitudinal section through a pressure or nip roller 11 is shown in FIG. 10, the described direct drive 39 in its installed position being shown on the right, and thus being inserted and attached on the end face 36 there, a so-called dummy 42 being provided in the form of a roller support device on the opposite end face 36, that is to say in the form of a roller carrier (shown with reference to FIG. 11). In terms of its function and external dimensions, the dummy 42 can be designed similarly to the direct drive 39. The direct drive 39 is preferably provided on the outside with a mounting section 41, via which the pressure and nip roller can be mounted on a carrier. The direct drive 39 with the mounting section 41 then forms the so-called fixed bearing, whereas the corresponding assembly section 45 on the opposite end face 36 of the pressure or nip roller 11 forms the floating bearing, in order to provide compensation here, in particular in the case of thermally induced different linear expansions.

With reference to FIG. 10, the structure of the direct drive according to a first exemplary embodiment will now be described on the basis of a partial axial sectional illustration through a pressure or nip roller 11 with built-in direct drive 39.

The direct drive 39 comprises fixed and rotating parts.

The fixed parts of the direct drive 39 include the drive housing 51, which is designed as a hollow cylinder. As shown in FIG. 10, it can be designed in two parts, for example, and comprise a hollow cylinder-shaped housing section 51a in the manner of a housing sleeve 51a and an end-face housing section 51b firmly connected to it in the manner of a housing cover 51b, which forms the mounting section 41. It is also possible, however, for the drive housing 51, as shown in FIGS. 11 and 12, to be formed at least substantially in one piece and to encompass the sleeve-shaped housing section 51a and the end-face housing section 51b, which forms the mounting section 41.

This drive housing 51 is held on its outer circumference by means of a roller bearing 55 and is supported against the outer rotating parts of the direct drive 39, which will be discussed below. In principle, all known embodiments can be considered as roller bearings 55. As is shown schematically in the figures, two roller bearings 55 arranged axially adjacent to one another are accommodated as bearings at the point mentioned.

In the drive housing interior 59 a stator 63 sits concentrically to the entire drive unit and thus concentrically to the rotational or central axis 31 axially penetrating the pressure and nip roller 11, which stator is also arranged so as to be fixed and non-rotating and ultimately directly on the inside of the drive housing 51 or at least indirectly, for example as shown with the interposition of an inner sleeve section 62 (as in the exemplary embodiment according to FIG. 12 discussed below), which is preferably part of the drive housing 51.

A rotor 65 is arranged radially inside to the stator 63, by means of which the mentioned electric motor 64 is formed.

The rotor 65 is seated on a drive shaft 67 through which the rotational or central axis 31 passes and which can be set in rotation by the aforementioned rotor 65 with respect to the stator 63 by means of electrical energy. Pointing in the axial direction away from the end 36 and thus protruding further into the roller cavity 37, a gear train 69 connects inside the drive housing 51, which can consist of a planetary gear train, for example.

The output shaft 71, which is guided out of the gear train 69 as an axial extension to the drive shaft 67, is connected to a radial torque transmission member 75, which in turn, via an optionally present coupling (not shown in the exemplary embodiment) for angular, radial and/or axial displacement, is part of a pot-like torque transmission device 77, which ends ring-shaped on the outside by a step in a flange or mounting ring 83, which in the inserted state of the direct drive rests on the end face 36 of the pressure roller and preferably covers it.

As can also be seen from the sectional illustration according to FIG. 10, the entire drive block of the direct drive 39 accommodated in the drive housing 51 is surrounded by rotating parts connected to the roller body 11a, in particular in the form of the above-mentioned pot-like or hollow cylinder-shaped torque transmission device 77, which via the so-called pot bottom is connected in the form of the radial torque transmission member 75 to the internal rotating members that can be driven by the electric motor 64, namely starting from the rotor 65 via the drive shaft 67, the gear train 69 and the output shaft 71 as well as an optionally provided coupling not shown in detail.

The stationary drive housing 51 is accommodated between the abovementioned drive train and the pot-shaped or hollow cylinder-shaped torque transmission device 77, which drive housing is radially spaced apart from it, and protrudes outwards beyond the roller body 11a at the end and may be mounted and firmly anchored there at the front end via the likewise stationary mounting section 41 on a support device.

The inner rotating parts (rotor, drive axle, gear train, drive axle and coupling, if a coupling is provided at all) are supported by two ring or roller bearings 53 and 54, which are preferably offset in the axial direction of the drive unit so that the electric motor 64 comes to rest with the stator 63 and the rotor 65 between these two roller bearings 53, 54. The two roller bearings 53 and 54 support the drive shaft 67 with respect to the fixed parts of the direct drive, i.e. directly or indirectly with respect to the fixed drive housing 51. In the exemplary embodiment shown, the inner roller bearing 53 is supported by a step-shaped sleeve 56 relative to the stationary, hollow cylinder-shaped drive housing.

The support of the rotating parts (pot-shaped or hollow cylinder-shaped torque transmission device 77) with the associated first cylindrical section 77a and the second step-shaped extended section 77b located on the outside of the drive housing 51 takes place via the first roller bearings 55 mentioned and then provided on the end face 36 on the one hand and via the second roller bearing 79 further axially offset from this and thus arranged further inside in the cavity 37 of the roller body, which second roller bearing 79 is arranged closer to the end of the drive housing 51 and thus adjacent to the radial torque transmission member 75. The second roller bearing 79 can also be designed as a double roller bearing. The intermediate sleeve 80, which is fixedly connected to the drive housing 51, is used to transmit the supporting force between the drive housing 51 and the second roller bearing 79. This intermediate sleeve 80 has a radial and axial spacing from the gear train 69 and a radial spacing from the torque transmission member 75, so that the supporting force is directed exclusively via the drive housing 51, and the intermediate sleeve 80 and the roller bearing 79 to the cup-shaped torque transmission device 77, without acting on the gear train 69.

The pot-shaped torque transmission device 77 is designed in such a way that the stationary parts and in particular the drive housing 51 come to rest at only a small radial distance within the rotating pot-shaped or hollow cylinder-shaped torque transmission device 77. As mentioned, this pot-shaped torque transmission device 77 is divided into, for example, the first section 77a adjoining the rotating housing base 75 (torque transmission member 75) and the radially widened section 77b adjoining it in the direction of the end face 36. In other words, the pot-shaped or hollow cylinder-shaped torque transmission device 77 has a step-shaped hollow cylinder-shaped extension 77b closer to the front end 36, which is dimensioned such that the aforementioned roller bearing 55 is accommodated between the cylindrical wall of the step-shaped extension 77b and the stationary drive housing 51. As is shown schematically in the figures, two roller bearings 55 arranged axially adjacent to one another are accommodated at the point mentioned.

On the end face 36 of the pressure roller, the torque transmission device 77 then comprises the mounting ring 83 adjoining it at the end face, which is provided with a plurality of axial bores 85 offset in the circumferential direction, into which fixing screws 87 are formed from the end face 36 into the end face of the roller body and may be screwed into the pressure or nip roller 11 with bores 11d provided with an internal thread. The radial dimension of the aforementioned mounting ring 83 preferably corresponds to the radial dimension of the protruding roller section 35, that is to say they preferably have the same diameter.

This creates a structure in which when the stationary parts of the direct drive 39 and, above all, the stationary drive housing 51 with stator 63 are connected, the radially inner rotor 65 may be set in rotation, wherein the speed of rotation is reduced by the following gear train 69 according to the transmission ratio. The subsequent output shaft 71 and the subsequent torque transmission devices 75 and 76 are then finally set in rotation via the rotating mounting ring 83 and its fixation on the end face of the roller body of the pressure and nip roller 11 of these rotating bodies.

By means of the drive unit 51, the speed of rotation can be precisely set, changed and/or controlled by using a corresponding control device.

As can also be seen from the sectional view according to FIG. 10, the entire drive unit 51 with the stationary drive housing 51 and the mounting section 41 fixedly mounted thereon and protruding further towards the free end only protrudes by a part of the total axial length beyond the end face 36 of the pressure and nip roller 11.

As can also be seen from FIG. 10, the drive 51 is supported by the two roller bearings 55 and 79, which are offset in the axial direction, with respect to the rotating parts of the pressure and nip rollers, whereby a tilting of the electric motor 64 with respect to the roller body 11a of the pressure and nip roller 11 is avoided.

The same advantages according to the invention can also be achieved when using such a direct drive 39 in contrast to the indirect drive explained with reference to FIGS. 2 to 6b. The material web to be treated and in particular the film can be kept pressed against a rotating roller or stretching roller 5 in a much more gentle and controlled manner.

It can also be seen from FIGS. 9 to 12 that, for example, a purge valve 91 is preferably provided on the side of the direct drive 39 (which is also referred to below as a purge or cooling air connection) in order to supply the inside of the roller body with a gaseous medium such as air.

The purge air connection 91 or the purge valve connection 91 comprises a line section extending radially to the axis of rotation or central axis 31. In the variant according to FIG. 10, this line section opens into the drive housing interior 59. In the variant according to FIGS. 11 and 12, this line section merges into a longitudinal bore 93 which is radially offset to the rotational or central axis 31 and which penetrates the housing section 51b, which adjoins the drive housing interior 59 (which accommodates the rotor and the stator) and comprises the mounting section 41. The further structure and the further mode of operation of the purge air device on the drive side is explained with reference to a further exemplary embodiment described below.

As can be seen from the axial sectional view according to FIG. 11, a central ventilation bore 89 running concentrically to the rotational or central axis 31 is also provided in the roller carrier 45 (dummy 42), which is preferably provided as a floating bearing, which ventilation bore ends at the end of the mounting section 45 there in an outlet 88. This makes it possible to have a purge medium coming from the purge air connection 91 flow through the entire pressure roller in order, for example, to correspondingly temper the pressure roller, in particular to cool it.

Since the roller body 11a of the drive and nip roller is preferably not held and supported by a continuous axle body, there is (as can be seen from the axial sectional view according to FIG. 11) on the opposite side of the pressure or nip roller 11, a corresponding mounting section or roller mounting carrier 45 provided, which, in terms of its axial length and diameter and the use of two roller bearings offset in the axial direction, for example with a roller bearing or roller bearing pair 155 on the one hand—comparable to roller bearing pair 55—and is structured similar to a further roller bearing 179 in terms of its supporting function to the described drive 51. It serves more or less only as a dummy 42 with an external mounting section 45, which is then preferably designed as a floating bearing. In this way, the pressure roller is held and supported on the side opposite the direct drive 39 and can rotate freely with respect to the non-rotating and stationary dummy 42.

On the basis of FIG. 12, a slightly modified exemplary embodiment for the drive side of the pressure roller is shown in an enlarged, excerpted axial longitudinal section, which basically corresponds to the exemplary embodiment already shown with reference to FIG. 11. This variant has advantages in particular with smaller roller diameters.

With this direct drive according to FIGS. 11 and 12, there is no longer any internal bearing 79 that absorbs the internal support torque. In the variant according to FIG. 12, the output shaft 71 is supported and held in the form of a stable gear train output shaft in a radially acting support device 75, which thus serves as a radial torque transmission member. This support device 75 can be designed, for example, as a coupling that is permeable to purge medium, which coupling under certain circumstances may also receive an optionally stepped bearing sleeve on the inside, in which the aforementioned gear train output shaft or rotor output shaft is then held and supported in engagement.

As a result, the bending moment is guided from the double bearing 55 via the inner sleeve 62 in the region of the rotor/stator system, an intermediate ring 56 on the left in FIGS. 10 to 12, and the gear train with stable gear train output shaft 71.

On the opposite side, the forces are intercepted via the outer sleeve, i.e. the sleeve-shaped torque transmission device 77, and passed to the fitting sleeve at the end of the roller, which can be designed as a separate component 77*b* or is part of the torque transmission device 77 as a step-shaped extended section 77*b*.

In FIGS. 11 and 12, the purge air connection 91 and its further line course are also shown, namely with a longitudinal bore 93.

Furthermore, a second optional connection for purge air can be provided, in particular for higher operating temperatures. Or also when this is advisable for reasons of the space available.

A second purge air connection, offset in the circumferential direction and aligned radially, that is to say radially circumferentially offset, may therefore optionally be provided (if, for example, the other cannot be used for reasons of space). The structure, arrangement and mode of operation can be comparable to the first purge air connection.

As a result, the air in the exemplary embodiment according to FIG. 12, may flow from the first purge air connection 91, via the longitudinal bore 93, subsequently via the motor compartment, via two bores 51*c* into the intermediate space between gear train 69 and outer tube 77 (torque transmission device 77) and further through the support device or coupling 75 into the inside of the roller. The support device or coupling 75 has gaps and openings through which the air can exit or flow. How the air may flow out at the opposite end of the roller has already been explained above.

The aforementioned electrical plug connection 101 for the electrical power supply, in particular for the electric motor, and for the data connection, in particular for the controller, may lead, similar to the purge air connection, to a longitudinal bore 103 in the housing section 51*b*, via which a connection to the drive housing interior 59 is provided.

In the case of the exemplary embodiment according to FIG. 10, the air flow coming from the purge air connection 91, for example via the intermediate ring 56 having passage openings, may initially flow into an intermediate space between the gear train 69 and the hollow cylinder-shaped gear train housing 51 or gear train housing section 51*a*, in order to flow from there via passages or bores not shown in detail to get into the intermediate space between the outside of the gear train housing and the rotation transmission device 77. Further passages or bores 77*c* are formed in this sleeve-shaped rotation transmission device 77, through which the air can flow further into the roller cavity 37.

It should also be noted at this point that the outermost surface of the sleeve-shaped rotating rotation transmission device 77 is with its outer surface at a radial distance from the inner surface of the hollow roller body, forming the mentioned distance space 97, at least for the greater part of its length.

In the exemplary embodiment according to FIG. 10, the aforementioned electrical plug connection 101 for the electrical power supply, in particular for the electric motor, and for the data connection, in particular for the control, may likewise lead directly to the drive housing interior 59 in a manner similar to the purge air connection.

In summary, it can be stated that the drive unit, that is to say the direct drive 39, is only provided on one side of the roller body, and preferably forms the fixed bearing. Theoretically, a corresponding drive would also be possible on both end faces, which can preferably be operated synchronously.

The drive unit of the direct drive 39 assumes not only the function of the drive, but also the function of the bearing and the swivel arm connection and thus the connection to the machine frame.

The floating bearing opposite to the single direct drive shown in the figures is geometrical, that is to say in terms of the spatial design and thus in terms of dimensions, it is comparable or similar to the direct drive. A purge air outlet can also be provided here.

Finally, it is noted that the pressure roller drive according to the invention can be used for the production of a wide variety of films and film types, for example for the production of BSF but also for the production of other types of film.

The invention claimed is:

1. A pressure roller arrangement, for a longitudinal stretching system for stretching a plastic film, comprising:
    a pressure roller with a roller body or roller body section with a roller surface,
    the roller body or roller body section has an axial length,
    the roller body or roller body section comprises, at least in one axial partial length, a nip roller film pressing region,
    wherein the pressure roller arrangement further comprises a drive device,
    wherein the drive device comprises a direct drive detachably mounted on at least one end-face of the pressure roller,
    the direct drive protrudes only by a maximum of a partial length of less than 50% of its entire axial length beyond the end-face of the pressure roller, and
    rotating parts of the direct drive are in rotational connection with the roller body or roller body section of the pressure roller.

2. The pressure roller arrangement according to claim 1, further comprising a stationary drive housing, wherein the stationary drive housing of the direct drive, which housing protrudes into a roller cavity of the pressure roller, is supported against the outer rotating parts of the direct drive via at least one roller bearing or two mutually axially offset roller bearings, wherein the roller bearing closer to the end of the direct drive protruding from the pressure roller is a double roller bearing.

3. The pressure roller arrangement according to claim 2, wherein a stator which is stationary together with the drive housing is arranged in the drive housing, which stator surrounds a rotor which is located therein and can be set in rotation and which is connected to a drive shaft that extends away from a front end of the pressure roller.

4. The pressure roller arrangement according to claim 3, wherein a gear train for speed reduction in the drive housing is provided downstream of the rotor.

5. The pressure roller arrangement according to claim 3, wherein the drive shaft proceeding from the rotor and/or an output shaft proceeding from a subsequent gear train
   a) is connected directly or indirectly via a radial torque transmission member to a cylindrical or hollow cylinder-shaped torque transmission device and/or is supported thereby, and/or
   b) is supported directly or indirectly via a roller bearing against a cylindrical or hollow cylinder-shaped torque transmission device,
   the torque transmission device being detachably connected at an end face to the roller body of the pressure roller.

6. The pressure roller arrangement according to claim 1, wherein the direct drive is provided with an externally protruding mounting section forming a fixed bearing, and in that on an opposite end face of the pressure roller a roller carrier which can be inserted into a cavity of the pressure roller and which protrudes at the end face is provided, which roller carrier forms a floating bearing.

7. The pressure roller arrangement according to claim 1, wherein the direct drive has, on a mounting section protruding at an end face beyond the pressure roller
   a) at least one purge air connection via which a purge medium that can flow off at an opposite end face of the pressure roller can be supplied, and
   b) at least one electrical connection at least for supplying energy to an electric motor and/or for data transmission.

8. The pressure roller arrangement according to claim 7, wherein
   a purge valve and/or the electrical connection in the mounting section,
      a) directly or
      b) at least via a longitudinal bore which is formed in an end-face housing section of a drive housing,
   opens into a drive housing interior, and
   in that a ventilation bore is provided at the opposite end of the pressure roller in a roller carrier inserted there, which bore ends at the end of the mounting section in an opening to an outlet, via which the purge medium coming from a purge valve can be passed through the pressure roller.

9. The pressure roller arrangement according to claim 1, wherein a drive housing
   a) is designed in two parts and comprises a hollow cylinder-shaped housing section in the manner of a housing sleeve and an end-face housing section fixedly connected thereto in the manner of a housing cover which forms a mounting section, or
   b) is formed at least substantially in one piece and comprises a sleeve-shaped housing section and an end-face housing section which forms a mounting section.

10. A stretching system comprising a pressure roller arrangement according to claim 1.

11. A method for changing a nip in the pressure roller arrangement according to claim 1, comprising aligning the pressure roller.

* * * * *